(12) United States Patent
Sundaresan et al.

(10) Patent No.: US 10,929,093 B2
(45) Date of Patent: *Feb. 23, 2021

(54) AUDIO DATA BUFFERING

(71) Applicant: Bose Corporation, Framingham, MA (US)

(72) Inventors: Rameshwar Sundaresan, Shrewsbury, MA (US); Michael William Elliot, Grafton, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/367,856

(22) Filed: Mar. 28, 2019

(65) Prior Publication Data

US 2019/0220244 A1 Jul. 18, 2019

Related U.S. Application Data

(63) Continuation of application No. 15/893,039, filed on Feb. 9, 2018, now Pat. No. 10,255,035, which is a
(Continued)

(51) Int. Cl.
*G06F 3/16* (2006.01)
*H04L 29/06* (2006.01)
*H04L 29/08* (2006.01)

(52) U.S. Cl.
CPC .......... *G06F 3/165* (2013.01); *H04L 65/4069* (2013.01); *H04L 65/60* (2013.01);
(Continued)

(58) Field of Classification Search
CPC ... H04L 65/4069; H04L 65/60; H04L 65/605; H04L 65/80; H04L 67/2847; G06F 3/165
(Continued)

(56) References Cited

U.S. PATENT DOCUMENTS

| 5,737,531 A * | 4/1998 | Ehley | H04L 29/06 709/208 |
| 2004/0192358 A1* | 9/2004 | Lai | H04M 1/72522 455/466 |

(Continued)

OTHER PUBLICATIONS

Anonymous: "slim tcp protocol spec?", May 2, 2005 (May 2, 2005), pp. 1-8, XP055298793, developers@lists. slimdevices.com; Retrieved from the Internet: URL:http://developers.slimdevices.narkive, com/KZ99iSEk/slim-tcp-protocol-spec [retrieved on Aug. 31, 2018] pp. 4-5.*

*Primary Examiner* — Michael C Lai
(74) *Attorney, Agent, or Firm* — Brian M. Dingman; Dingman IP Law, PC

(57) ABSTRACT

A method of buffering audio data in an audio playback system that is adapted to receive and playback separate, discrete audio files from one or more audio sources, where the audio files comprise audio data, and where the audio playback system comprises a master device that receives audio files from a source, buffers the received audio data, and distributes the buffered audio data to one or more active slave audio playback devices. The master device requests a first audio file from an audio source, receives the first audio file, buffers audio data from the first audio file, and sends buffered audio data from the first audio file to one or more active slave audio playback devices. During playback of the audio data from the first audio file, the master device requests a second audio file from an audio source, receives the second audio file, buffers audio data from the second audio file, and sends buffered audio data from the second audio file to one or more active slave audio playback devices.

21 Claims, 3 Drawing Sheets

Related U.S. Application Data continuation of application No. 14/723,549, filed on May 28, 2015, now Pat. No. 9,928,024.

(52) U.S. Cl.
CPC ............ H04L 65/605 (2013.01); H04L 65/80 (2013.01); H04L 67/2847 (2013.01)

(58) Field of Classification Search
USPC .......................................................... 709/208
See application file for complete search history.

(56) References Cited

U.S. PATENT DOCUMENTS

| | | | | |
|---|---|---|---|---|
| 2007/0110074 A1* | 5/2007 | Bradley | .............. | H04L 67/1095 370/395.51 |
| 2013/0232214 A1* | 9/2013 | Millington | ............ | H04J 3/0664 709/208 |
| 2013/0251329 A1* | 9/2013 | McCoy | ................ | H04N 21/654 386/201 |
| 2015/0100143 A1* | 4/2015 | Gao | .................... | H04L 65/4076 700/94 |

\* cited by examiner

AUDIO DATA BUFFERING

CROSS-REFERENCE TO RELATED APPLICATIONS

This application is a continuation of and claims priority of application Ser. No. 15/893,039, filed on Feb. 9, 2018, now U.S. Pat. No. 10,255,035, issued on Apr. 9, 2019, and of U.S. Pat. No. 9,928,024, issued on Mar. 27, 2018. The entire disclosures of the two patents are incorporated herein by reference for all purposes.

BACKGROUND

This disclosure relates to the buffering of audio data.

Audio systems can be arranged to stream digital audio data to one or more of multiple audio playback devices that are connected to a network such as a local area network (LAN). Each audio playback device is able to play the audio data through one or more loudspeakers. In some such networked audio systems a master device receives the audio data from an audio source and manages the distribution of the data over the network to the other audio devices, which are considered slaves that receive and then play the audio that is served by the master.

SUMMARY

A master audio playback device is the gateway for routing digital audio to multiple networked slave audio playback devices. In some such audio distribution systems where the streamed content consists of discrete audio files, the master device receives an audio file and distributes it to the slave devices. Only when playback of the current audio file has been completed does the master request the next audio file. Since playback of the second audio file doesn't begin until a portion of the second file has been buffered by the master device, this arrangement can result in a delay between playback of audio files. Such delays can be avoided by configuring the master device to begin downloading of the next audio file while the current audio file is being played back. This way the master device and the slave devices have enough of the next audio file buffered by the time playback of the current audio file has concluded to immediately begin playback of the next file.

All examples and features mentioned below can be combined in any technically possible way.

In one aspect, a method of buffering audio data in an audio playback system that is adapted to receive and playback separate, discrete audio files from one or more audio sources, where the audio files comprise audio data, and where the audio playback system comprises a master device that receives audio files from the sources, buffers the received audio data, and distributes the buffered audio data to one or more active slave audio playback devices, includes the master device requesting a first audio file from an audio source, receiving the first audio file, buffering audio data from the first audio file, and sending buffered audio data from the first audio file to one or more active slave audio playback devices. During playback of the audio data from the first audio file, the master device requests a second audio file from an audio source, receives the second audio file, buffers audio data from the second audio file, and sends buffered audio data from the second audio file to one or more active slave audio playback devices.

Embodiments may include one of the following features, or any combination thereof. The discrete audio files may be received from a plurality of audio sources. In one non-limiting example, each audio file is from a different source (e.g., a different universal resource locator (URL)). The audio data may be played back by both the master device and the active slave audio playback devices. The method may further include synchronizing, by the master device, the playback of audio data. The master device and the active slave audio playback devices may have internal clocks, and synchronizing the playback of audio data may comprise the master device determining a playback time per its internal clock and transmitting the determined playback time to the active slave audio playback devices.

Embodiments may include one of the following features, or any combination thereof. The master device may communicate with the active slave audio playback devices via a wireless access point. The master device may have a ring buffer wherein the oldest buffered data is overwritten first. The master device may request the next audio file as soon as the master device finishes receiving the current audio file. The master device may send buffered audio data to the active slave audio playback devices immediately after the received audio data is buffered by the master device.

In another aspect, a method of buffering audio data in an audio playback system that is adapted to receive and playback separate, discrete audio files from a plurality of different audio sources, where the audio files comprise audio data, and where the audio playback system comprises a master device that receives audio files from the sources, buffers the received audio data, and distributes the buffered audio data to one or more active slave audio playback devices, wherein the master device and the active slave audio playback devices have internal clocks, and wherein audio data is played back by both the master device and the active slave audio playback devices, includes the master device requesting a first audio file from a first audio source, receiving the first audio file, buffering audio data from the first audio file, and sending buffered audio data from the first audio file to one or more active slave audio playback devices. As soon as the master device finishes receiving the first audio file, the master device requests a second audio file from a different audio source, receives the second audio file, buffers audio data from the second audio file, and sends buffered audio data from the second audio file to one or more active slave audio playback devices. The master device sends buffered audio data to the active slave audio playback devices immediately after the received audio data is buffered by the master device. The master device also synchronizes the playback of audio data by determining a playback time per its internal clock and transmitting the determined playback time to the active slave audio playback devices.

DETAILED DESCRIPTION

An audio distribution and playback system that has a number of audio playback devices can be configured such that one of the devices acts as a master device and controls the distribution of audio data to other audio playback devices, which are considered slave audio playback devices. When the system is receiving discrete audio files as opposed to a continuous stream of audio data, during playback of the current audio file the master can request the next audio file. This next audio file is buffered by the master and distributed to the slaves for buffering by the slaves, still during playback of the current audio file. This way, when playback of the current file ends there is sufficient data from the next file that has been buffered such that playback of the next file can begin immediately. Also, pre-buffering allows the master to synchronize among all of the devices such that playback can occur simultaneously across the master and all of the slaves.

Figure 1:
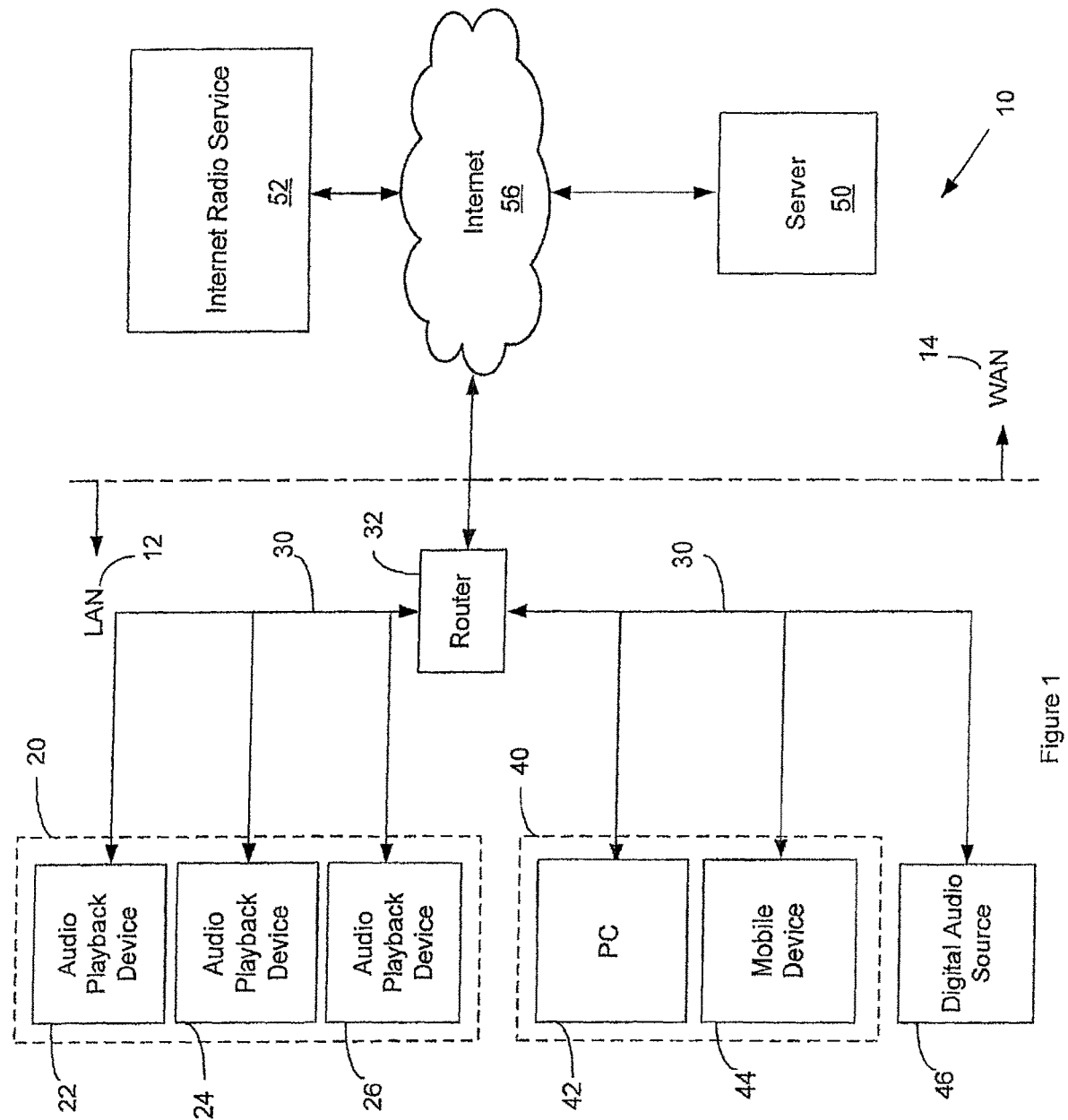
FIG. 1 is a schematic block diagram of an audio distribution system which includes an audio playback system that can be used in the present method.

Audio distribution system 10, FIG. 1, can be used to accomplish a method for buffering and distributing audio data among audio playback devices that are connected to a network. System 10 also includes the computer devices that may be involved in the subject audio distribution. System 10 is adapted to deliver digital audio (e.g., digital music). System 10 includes a number of audio playback devices 22, 24 and 26 which are among the group of audio output devices 20 of system 10. In one non-limiting embodiment, the audio playback devices are identical devices that each include a digital to analog converter that is able to receive digital audio signals and convert them to analog form. The audio playback devices also include an electro-acoustic transducer that receives the analog audio signals and transduces them into sound. The audio playback devices also include a processor. The audio playback devices are connected to one another and also connected to the router/access point 32 via network 30. The audio playback devices are thus able to communicate with one another. Network 30 can be a wired and/or wireless network, and can use known network connectivity methodologies. Network 30 is part of a local area network (LAN) 12 which is connected to wide area network (WAN) 14, in this non-limiting example by connection to Internet 56. LAN 12 also includes one or more separate computing devices 40 and one or more separate local digital audio sources 46. In this non-limiting example the computing devices include a personal computer 42 and a mobile computing device 44 such as a smart phone, tablet or the like. WAN 14 includes server 50 and Internet radio service 52 which can both communicate with the LAN via Internet 56.

One use of system 10 is to play audio files over one or more of the audio playback devices in group 20. The sources of digital audio provide access to content such as audio files that move over network 30 to the audio playback devices. The sources of such audio files can include, for example, Internet radio stations and user defined playlists. Each of such digital audio sources maintains a repository of audio content which can be chosen by the user to be played over one or more of the audio playback devices. Such digital audio sources can include Internet-based music services such as Pandora®, Spotify® and vTuner®, for example. Network attached storage devices such as digital audio source 46, and media server applications such as may be found on a mobile computing device, can also be sources of audio data. Typically, the user selects the audio source and the playback devices via PC 42 and/or mobile device 44. Selection could also potentially be made through devices 22, 24 or 26.

When a user has chosen to have an audio stream played on more than one of the audio playback devices, in order for the music to be properly synchronized such that the same tracks are playing synchronously on all of the audio playback devices there needs to be appropriate and sufficient coordination among all of the audio playback devices. One manner in which such coordination can be accomplished is to use one of the audio playback devices to control the distribution of audio data to all of the other audio playback devices that are being used to play content. This device which controls audio data distribution to the other active playback devices can be considered a master device, and the rest of the active devices (i.e., the rest of the playback devices that are being used to play content) can be considered to be active slave devices. Alternatively, the system can have a dedicated master device.

Since all of the audio playback devices 22, 24 and 26 have the same functionality, each of them can act as the master device. One non-limiting manner in which the system can dynamically determine which device will take on the functionality of the master is as follows. Each of the audio playback devices would determine its level of one or more network-related performance criteria which are relevant to its functionality as a master device. When the audio playback devices have the same hardware and firmware, a relevant performance criterion is the rate of successful data transfer on network 30 accomplished by the device, which can be determined based on the data link rate or bit rate (i.e., the number of bits conveyed per unit of time) modified by the rate of data loss on the network. In one non-limiting example the performance metric is the rate of successful data transmission determined based on the following formula, (physical data rate)*(1−packet error rate). Other known means of determining a network performance criterion can alternatively be used. The measurement of successful data transfer rate (or other network performance criterion) can be accomplished by each audio playback device individually. However, the criterion could be determined in other ways, for example under control of software resident in personal computer 42, or software resident in server 50. In one example, each of the active audio playback devices is adapted to measure its performance metric. The measurement of successful data transfer rate can be conducted essentially continuously as the device is operated, and the measurement can be saved in an appropriate manner each audio playback device has a processor and associated memory, and the processor can be used to monitor this and store appropriate data in the local device memory. In this manner it is possible to consider the successful data transfer rate both instantaneously and as it has developed over time.

Once the successful data transfer rates of all the active devices have been determined based on the predetermined criterion or criteria such as described above, the device with the best successful data transfer rate can be designated as the master device, and all of the other devices are designated as slave devices. The master would communicate this status to the slaves, which would acknowledge their status to the other devices.

Figure 2:
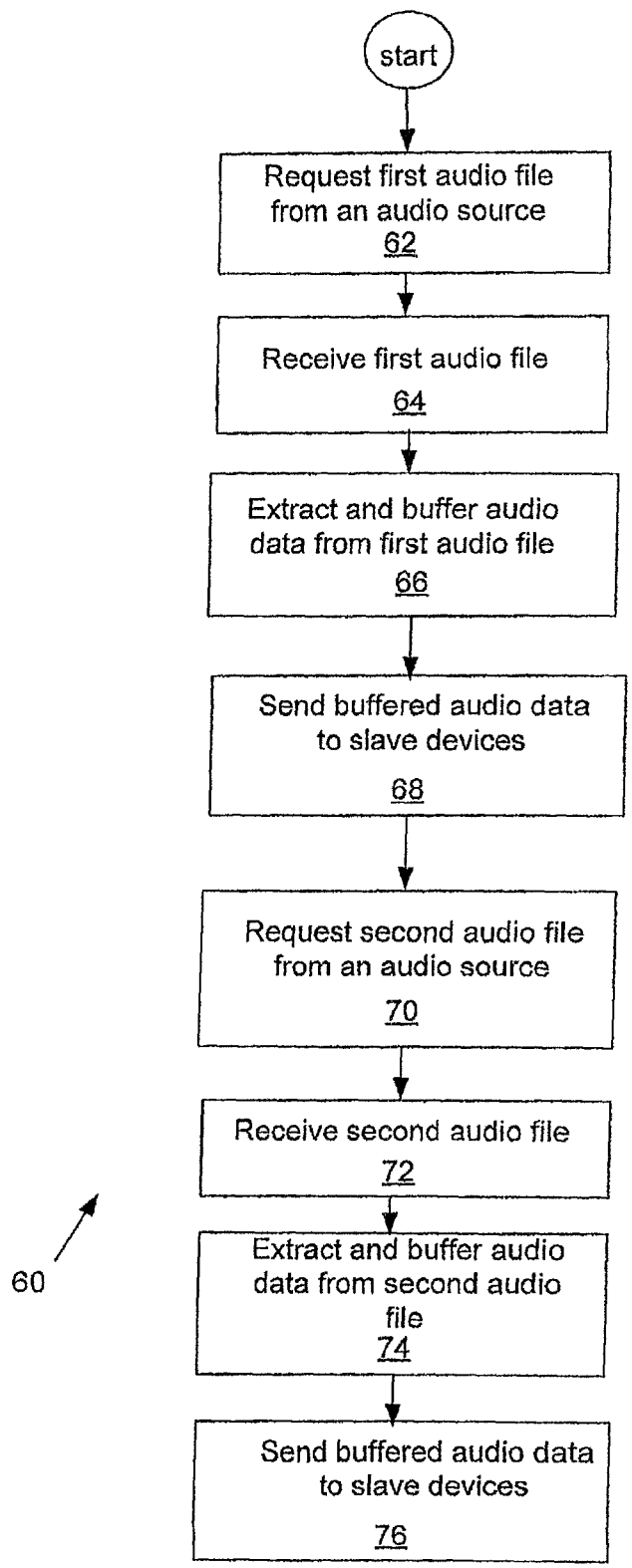
FIG. 2 illustrates a methodology for buffering audio data in an audio playback system such as that of FIG. 1.

One method of buffering audio data in an audio playback system is detailed in FIG. 2 wherein method 60 begins when the master device requests a first audio file from an audio source, step 62. Typical sources were described above. Of particular interest herein are sources where the audio is served as discrete files (e.g., each song is a discrete file) as opposed to the files being part of a continuous stream. The master receives the requested audio file, step 64 and extracts and buffers audio data from the audio file, step 66. Requesting, receiving, extracting and buffering audio data from an audio file are each known per se in the art and need not be further described herein. Once buffering of the data has begun, the master sends buffered audio data to each of the active slave audio playback devices, step 68. The master device can use a ring buffer for the data, wherein the oldest data is overwritten first. Ring buffers are known in the art.

Typically, all of the audio devices (both the master and slaves) are adapted to playback audio data. The devices can either begin playback as the data is received and buffered, or later. In one non-limiting application, playback is controlled by the master device. Each of the devices can have an internal clock. The master device can synchronize the playback of audio data by determining a playback time per its internal clock and transmitting this determined playback time to the active slave audio playback devices. Then each device plays the data back per these playback times.

During playback of the audio data of the first downloaded audio file, the master device requests a second audio file from an audio source, step 70. This file can come from the same source as the first file, or from a different source. With certain sources such as Pandora, each audio file has its own URL or address. In this case, the master device will request a file from the address. Still during playback of the first file, this second audio file is received, step 72, and the audio data is extracted and buffered from this file, step 74. The buffered data is then sent to the active slave devices, step 76. Thus, all the active devices involved in the playback will have audio data buffered and ready for playback as soon as playback of the current file has been completed. This can eliminate delays between playback of audio files. It can also help to properly synchronize playback among multiple active devices.

The master manages distribution of data to the slaves. This management can be accomplished in a manner that is known in the networking field. For example, the master device can push the audio data it has received to the slave devices, or the master can make the audio data available for the slave devices to retrieve. The audio data can be delivered in packets. The packets can be time stamped so that each of the devices can play the data in the proper order and at the proper time such that the audio outputs of the devices are synchronized. As a result, for example in a home network where there are audio playback devices in several rooms, the same music will be playing in all of the rooms at the same time.

Figure 3:
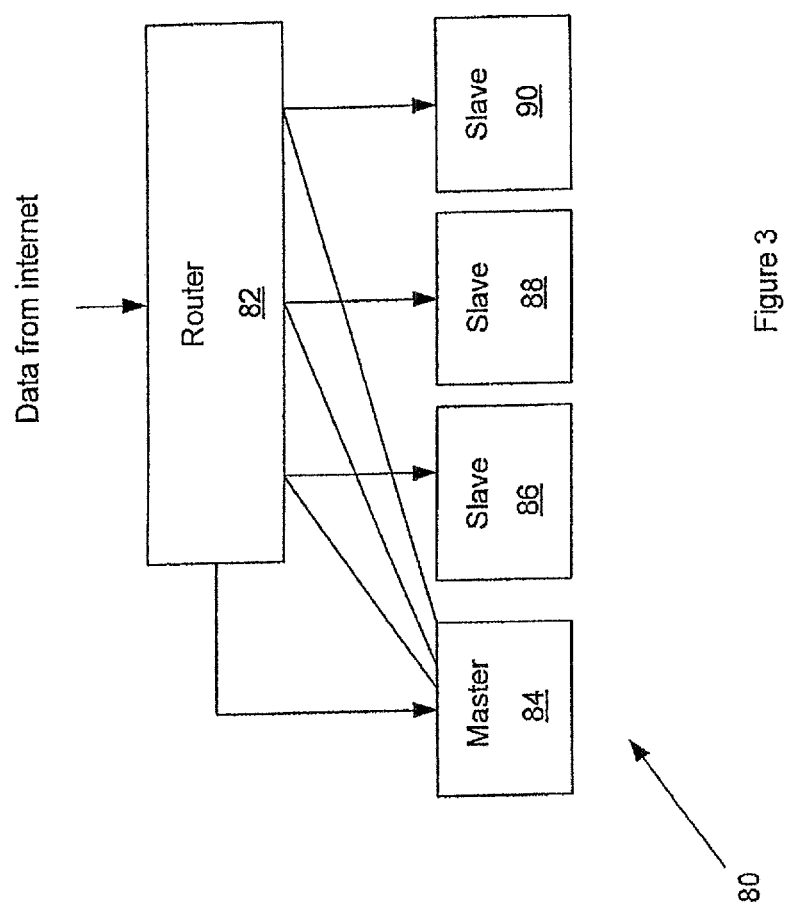
FIG. 3 illustrates a relationship among master and slave devices in an audio playback system.

FIG. 3 schematically depicts system 80 in which, in part, audio data is routed from a master device to one or more slave devices. Audio data from the internet is received by router 82 and routed to master audio playback device 84. Device 84 controls the distribution of the data to active slaves 86, 88 and 90. The data moves from the master to each slave through router 82.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

Elements of some figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawings.

A number of implementations have been described. Nevertheless, it will be understood that additional modifications may be made without departing from the scope of the inventive concepts described herein, and, accordingly, other embodiments are within the scope of the following claims.

What is claimed is:

1. A method of synchronizing playback of discrete audio files that comprise audio data in an audio playback system that comprises a master audio playback device and one or more slave audio playback devices, comprising
   during synchronized playback of a first discrete audio file by the master audio playback device and the one or more slave audio playback devices, the master audio playback device is configured to:
      receive audio data of a second discrete audio file; and
      send the received audio data of the second discrete audio file to the one or more slave audio playback devices.

2. The method of claim 1, wherein the first discrete audio file is received by the master audio playback device from a first audio source.

3. The method of claim 2, wherein the second discrete audio file is received by the master audio playback device from a second audio source.

4. The method of claim 3, wherein the first and second audio sources are different universal resource locators (URLs).

5. The method of claim 1, wherein the master audio playback device requests the second discrete audio file as soon as the master audio playback device finishes receiving the first discrete audio file and during synchronized playback of the first discrete audio file.

6. The method of claim 1, wherein the master audio playback device sends buffered audio data to the one or more slave audio playback devices immediately after the received audio data is buffered by the master audio playback device and during synchronized playback of the first discrete audio file.

7. The method of claim 1, wherein the master audio playback device comprises an internal clock, and wherein the method further comprises the master audio playback device synchronizing the playback of audio files by the master audio playback device and the one or more slave audio playback devices by determining a playback time using the internal clock, and transmitting the determined playback time to the one or more slave audio playback devices.

8. An audio playback device, comprising:
an electro-acoustic transducer,
a processor; and
memory comprising instructions, which, when executed by the processor, cause the audio playback device to:
during synchronized playback of a first discrete audio file by the audio playback device and one or more other audio playback devices, receive audio data of a second discrete audio file and send the received audio data of the second discrete audio file to the one or more other audio playback devices.

9. The audio playback device of claim 8, wherein the first discrete audio file is received by the audio playback device from a first audio source.

10. The audio playback device of claim 9, wherein the second discrete audio file is received by the audio playback device from a second audio source.

11. The audio playback device of claim 10, wherein the first and second audio sources are different universal resource locators (URLs).

12. The audio playback device of claim 8, wherein the audio playback device requests the second discrete audio file as soon as the audio playback device finishes receiving the first discrete audio files and during synchronized playback of the first discrete audio file.

13. The audio playback device of claim 8, wherein the audio playback device sends buffered audio data to the one or more other audio playback devices immediately after the received audio data is buffered by the audio playback device and during synchronized playback of the first discrete audio file.

14. The audio playback device of claim 8, wherein the audio playback device further comprises an internal clock, and wherein the instructions when executed by the processor further cause the audio playback device to synchronize the playback of audio files by the audio playback device and the one or more other audio playback devices by determining a playback time using the internal clock, and transmitting the determined playback time to the one or more other audio playback devices.

15. A computer program product having a non-transitory computer-readable medium including computer program logic encoded thereon that, when performed on an audio playback device, causes the audio playback device to:
during synchronized playback of a first discrete audio fib by the audio playback device and one or more other audio playback devices:
receive audio data of a second discrete audio file; and
send the received audio data of the second discrete audio file to the one or more other audio playback devices.

16. The computer program product of claim 15, wherein the first discrete audio file is received by the audio playback device from a first audio source.

17. The computer program product of claim 16, wherein the second discrete audio file is received by the audio playback device from a second audio source.

18. The computer program product of claim 17, wherein the first and second audio sources are different universal resource locators (URLs).

19. The computer program product of claim 15, wherein the audio playback device requests the second discrete audio file as soon as the audio playback device finishes receiving the first discrete audio file and during synchronized playback of the first discrete audio file.

20. The computer program product of claim 15, wherein the audio playback device sends buffered audio data to the one or more other audio playback devices immediately after the received audio data is buffered by the audio playback device and during synchronized playback of the first discrete audio file.

21. The computer program product of claim 15, wherein the audio playback device comprises an internal cock, and wherein the audio playback device synchronizes the playback of audio files by the audio playback device and the one or more other audio playback devices by determining a playback time using the internal clock, and transmitting the determined playback time to the one or more other audio playback devices.

* * * * *